United States Patent Office 3,740,344
Patented June 19, 1973

3,740,344
NONIONIC EMULSIFIERS FOR CONTROLLING THE SETTING RATE OF ANIONIC EMULSION
Richard L. Ferm, Lafayette, Calif., assignor to Chevron Research Company, San Francisco, Calif.
No Drawing. Filed Jan. 4, 1971, Ser. No. 103,847
Int. Cl. B01j 13/00
U.S. Cl. 252—311.5        7 Claims

ABSTRACT OF THE DISCLOSURE

Bituminous emulsions useful in quick-setting slurry seal compositions are provided by combining (1) from 45 to 75 parts by weight bitumen, (2) from 0.3 to 2.0 parts by weight of an alkyl-aryl sulfonate, (3) from 0.2 to 1.0 part of a nonionic emulsifier, and (4) sufficient water to give a total composition having 100 parts by weight.

BACKGROUND OF THE INVENTION

Field of the invention

The ever-increasing traffic and heavy wear to which pavements are exposed has aggravated the need for a rapid and efficient means for repairing pavements to a long wearing surface. Heretofore, slurry seals have been widely used to repair pavements, but have been deficient in requiring relatively long times before they hardened to a useful surface. The slurry seals set by evaporation. Therefore, the time could greatly vary depending on the temperature and humidity, as well as other environmental factors.

In addition, the slurry seals were particularly susceptible to rain. If they had not hardened to a cohesive surface, a rainstorm could rapidly wash away or seriously damage the slurry seal pavement. Because of the deficiencies of prior slurry seals, they have not found the wide use which their convenience of application would otherwise suggest.

Recent developments have led to the use of anionic slurry seal compositions which set up rapidly thereby avoiding the potential problem of rain damage allowing use of the pavement in a short time.

U.S. application 68,502 filed Aug. 31, 1970, in the name of Richard L. Ferm and Chester C. Latif, the disclosure of which is incorporated herein by reference, discloses anionic slurry seal compositions formed by combining an anionic bituminous emulsion with a mineral aggregate. Prior to spreading the mixture to form a paved surface, a small quantity of cement or lime is added as a set initiator. The composition is then spread within five minutes, more usually at least two minutes, and sets to a usable surface in a short time.

While the set initiator may be added at any time, it preferably is added during the initial wetting of the aggregate prior to the addition of the bituminous emulsion. The set initiator and aggregate are mixed in order to have the set initiator uniformly distributed throughout the aggregate. The bituminous emulsion is then added as mixing continues.

The anionic emulsifiers taught as useful in U.S. application 68,502 have the following formula:

R—SO₃M wherein R is a hydrocarbon group of from 8 to 24 carbon atoms, more usually of from 12 to 20 carbon atoms and normally having an average number of carbon atoms in the range of about 14 to 18 and may be aliphatic, alicyclic, aromatic or combinations thereof, e.g., alkaryl or aralkyl, and M is alkali metal or ammonium.

The bituminous emulsions of U.S. application 68,502 contain from at least about 0.1 to 3 weight percent (based on the total weight of said emulsion) of the anionic emulsifier.

The emulsifier range specified above is based on the operable limits within which a satisfactory slurry seal composition can be obtained. With a given emulsifier, however, the most preferred concentration will vary. The least quantity of emulsifier which gives a good product is obviously the most desirable.

As previously pointed out, the period of time for set up of the slurry seal composition (once the emulsion, aggregate and set initiator have been combined) is very important. Sufficient time for thorough mixing before spreading the slurry seal is critical. If the set up time is too short, the emulsion will break while still in the mixer and form an unworkable congealed mass. Further, even if the mixture is spread before set up, it may not have the required strength and a crumbly weak structure may be formed if breaking of the emulsified asphalt particles occurs before consolidation of the mixture is complete.

The problem is particularly severe when the hydrocarbon group R in the anionic emulsifiers described above is alkaryl. The slurry seal composition formed using, for example, an alkyl benzene sulfonate as the emulsifier sets much more rapidly than does a slurry seal composition formed using an alpha olefin sulfonate when the emulsifiers are used on an equal molar basis.

One method for increasing the set-up time to allow adequate time for mixing and spreading of the slurry seal composition is to increase the quantity of anionic emulsifier being used. Such a procedure is not attractive from the standpoint of optimum utilization of the emulsifier and does not give rise to an efficient economical approach to the use of slurry seals.

This invention then is concerned with the development of bituminous emulsions for use in quick-setting slurry seal compositions in which the quantity of anionic emulsifier required can be held to a minimum for most effective utilization of the emulsifier. The method employed requires the use of a minor amount of a limited family of nonionic emulsifiers.

Description of the prior art

U.S. Pat. 2,862,831 discloses that addition of a stabilizing agent or protective colloid will convert a quick-breaking oil-in-water-type emulsion into a slow-setting or mixing type emulsion.

U.S. Pat. 3,276,886 discloses that a medium- or slow-setting alkaline cationic asphalt emulsion can be obtained by incorporating select nonionic emulsifiers into the emulsion.

U.S. Pat. 3,276,887 discloses that select nonionic emulsifiers extend the mixing time of cationic asphalt emulsions.

U.S. Pat. 3,432,320 describes nonionic oil-in-water-type asphalt emulsions using select nonionic emulsifying agents as the primary emulsifier to which can be added either cationic or anionic emulsifiers as secondary emulsifying agents.

U.S. Pat. 3,513,005 discloses bituminous emulsions using organic sulfonates in combination with nonionic surface active agents.

British Pat. 1,058,056 discloses that select non-ionic emulsifiers can be used in conjunction with secondary anionic emulsifying agents such as alkyl-aryl sulfonates.

SUMMARY OF THE INVENTION

Bitumen in water emulsions are provided by combining (1) a bitumen, (2) a primary emulsifier which is an ammonium or alkali metal salt of an alkyl-aryl sulfonic acid, (3) a secondary emulsifier which is nonionic in nature, and (4) water. The emulsions find use in slurry seal compositions where a rapid but controlled set-up is desired to provide a strong cohesive surface which can support traffic within a short time.

DETAILED DESCRIPTION OF THE INVENTION

Bitumen in water emulsions are provided by combining (1) from 45 to 75 parts bitumen, (2) from 0.3 to 2.0 parts of an anionic emulsifier, (3) from 0.2 to 1.0 parts of a nonionic emulsifier, and (4) sufficient water to give a total composition having 100 parts (all parts by weight based on the total composition).

The composition finds use in slurry seal compositions where a rapid but controlled set up is desired to provide a strong cohesive surface which can support traffic within a short time.

Anionic emulsifiers

The anionic emulsifiers useful in this invention have the formula:

$$R-SO_3M$$

wherein R is an alkyl-aryl group wherein the alkyl portion has from 8 to 18 carbon atoms, more usually from 10 to 16 carbon atoms and can be branched or straight-chain, and M is alkali metal or ammonium. Particularly preferred are the sodium salts.

Nonionic emulsifiers

The nonionic emulsifiers useful in this invention are preferably the condensation products of ethylene oxide and an alkylated phenol, such as Igepal CO–990, an ethoxylated nonyl phenol having 100 ethyleneoxy units, a product of General Aniline & Flm Corporation. Condensation products with a minimum of 10 ethyleneoxy units and a maximum of 200 are useful in this invention with 40 to 120 ethyleneoxy units preferred. The alkyl group(s) on the phenol should have from 8 to 18 carbon atoms and can be branched or straight chains.

Condensation of products of from 10 to 200, preferably 40 to 120, ethyleneoxy units with fatty alcohols of from 10 to 22 carbon atoms such as decyl, lauryl, cetyl, stearyl, etc., are also satisfactory. The unsaturated fatty alcohols such as oloyl, linoloyl, and linolenyl may also be used.

Condensation products of from 10 to 200, preferably 40 to 120, ethyleneoxy units with monoesters of fatty acids such as those described below with glycerol or sorbitol are also satisfactory. Examples of suitable monoesters are sorbitan monopalmitate, glycerol monostearate, and glycerol monooleate.

Condensation products of from 10 to 200, preferably 40 to 120, ethyleneoxy units with long-chain fatty acids of from 10 to 22 carbon atoms are also satisfactory. Specific examples of satisfactory fatty acids are stearic, palmitic, oleic, linoleic, linoleic acid and the like.

Bitumens

The invention is illustrated in the present specification by examples which involve preparation and testing of emulsions of asphalt, since among emulsified bituminous materials, asphalt emulsions are most frequently used for road construction and repairs. Emulsions of other bituminous materials, for instance, those of coal tar, pitch, and the like may also be similarly formulated for use in this invention. It may be noted that penetration of the bitumen (asphalt) is not critical, and any bitumen capable of being emulsified may be used in accordance with the invention.

A number of compositions were prepared and tested. The following examples are offered by way of illustration and not by way of limitation. All parts are by weight unless otherwise specified.

EXAMPLE 1

A bituminous emulsion was formed having a residue of 60 percent by use of a colloid mill operating with the asphalt phase at 260° F. and using a mill time of 63 seconds. The aqueous phase had a weight of 2000 grams and contained 23 milliliters of a 25 percent sodium hydroxide solution. 25 grams of Pilot ABS–99 and, a commercial $C_{12}$–$C_{14}$ branched-chain alkylated benzene sulfonic acid having an acid number of about 191 mg. KOH/g. and containing 97.5 percent sulfonic acid, a product of Pilot Chemical Company, and 10 grams of Dow Phenosulfonic Acid were used as emulsifiers. This emulsion is designated as No. 1. The emulsion had a residue of 60 weight percent.

In a like manner, 60 weight percent residue emulsions were prepared using the emulsifiers shown in Table I and the volumes of 25 weight percent NaOH solution also shown in Table I. The aqueous phases of the emulsions in Table I each had a weight of 2000 grams.

TABLE I

| Emulsion Number | Emulsifiers | NaOH solution, ml. |
|---|---|---|
| 2 | {83 grams of $C_{15}$–$C_{18}$ alpha olefin sulfonate<br>{10 grams Dow phenol sulfonic acid | 12.8 |
| 3 | {25 grams Sulfotex ABL–100 acid [1]<br>{10 grams $Na_2Cr_2O_7$ (adhesion aid) | 20.4 |
| 4 | {25 grams Sulfotex UBL–100 acid<br>{10 grams $Na_2Cr_2O_7$ (adhesion aid) | 21 |

[1] A commercial linear $C^{12}$–$C^{14}$ chain alkylated benzene sulfonic acid, acid number about 185 mg. KOH/g. and containing about 98 percent sulfonic acid. Product of Textilana Corp.

EXAMPLE 2

Using the four emulsions of Example 1, the setting rates for slurry seal mixes made using the emulsions were determined. All the mixes were made using 100 grams of 5/16 X dust and 18 grams of emulsion. The set initiator was added to the dry aggregate prior to addition of water and the emulsion. The results are shown in Table II following:

TABLE II

| Emulsion No. | Initiator | Grams water used to prewet aggregate | Pot life,[1] seconds | Set time of slurry seal and/or quality |
|---|---|---|---|---|
| 1 | 0.2 grams lime | 12 | 10 | Poor (too slow). |
| 2 | 0.5 grams portland cement. | 12 | 20 | Fast. |
| 3 | 0.2 grams lime | 12 | 10 | Do. |
| 4 | 0.2 grams lime | 12 | 5 | Do. |

[1] Defined as time during which mix can be spread and shaped.

EXAMPLE 3

Using the same emulsions as set forth in Example 1 and the same set initiators in the same amounts and procedure of Example 2, the setting rates for slurry seals were again tested. However, the emulsions each had present 0.35 percent by weight of Igepal CO–990, an ethoxylated nonyl phenol (emulsions now being designated as 1A, 2A, 3A and 4A). The results are shown in Table III below:

TABLE III

| Emulsion | Pot life | Set time and/or remarks |
|---|---|---|
| 1A | 2 minutes | Reasonably fast. |
| 2A | 1 minute, 30 seconds | Fast. |
| 3A | 1 minute | Do. |
| 4A | 5 minute, 30 seconds | Reasonably fast. |

EXAMPLE 4

Asphalt emulsions having a residue of 65 percent were prepared on a colloid mill using (1) 0.4 percent by weight of Igepal CO–990 and 0.6 percent of Sulfotex UBL–100 and (2) 0.6 percent Igepal CO–990 and 0.40 percent Sulfotex UBL–100 respectively. A mill time of 63 seconds and an asphalt temperature of 260° F. was used. The emulsions were used to make two separate slurry seals having the following composition:

(a) 500 grams granite dust aggregate
(b) 65 grams of water
(c) 125 grams of emulsion
(d) 2.5 grams of lime The set initiator cement and water were added to the aggregate and mixed prior to addition of the emulsion. The slurry seal using emulsion (1) formed an excellent mix, had a pot life of 60 seconds plus, and set up well. The slurry seal using emulsion (2) formed a good mix, had a pot life of 60 seconds plus, and set up fast.

It is apparent that many widely different embodiments of this invention may be made without departing from the scope and spirit thereof; and, therefore, it is not intended to be limited except as indicated in the appended claims.

I claim:

1. A bituminous emulsion useful in quick-setting slurry seal compositions comprised of (1) from about 45 to about 75 parts by weight bitumen, (2) from about 0.3 to about 2.0 parts by weight of an anionic emulsifier of the formula $$R-SO_3M$$

wherein R is a hydrocarbyl alkyl-aryl group wherein the alkyl portion of said group has from 8 to 18 carbon atoms and M is alkali metal or ammonium, (3) from 0.2 to 1.0 part of a nonionic emulsifier selected from the group consisting of (A) condensation products of ethylene oxide and an alkylated phenol wherein said nonionic emulsifier has from 10 to 200 ethyleneoxy units, (B) condensation products of ethylene oxide and fatty alcohols, (C) condensation products of ethylene oxide and long-chain fatty acids, and (D) condensation products of ethylene oxide and monoesters of fatty acids and a polyol, and (4) sufficient water to give a total composition having 100 parts by weight.

2. Claim 1 wherein the alkyl portion of R has from 10 to 16 carbon atoms.

3. Claim 2 wherein said nonionic emulsifier is the condensation product of from 40 to 120 ethyleneoxy units and alkylated phenol.

4. Claim 3 wherein M is sodium.

5. Claim 3 wherein said anionic emulsifier is the sodium salt of a linear $C_{12}$-$C_{14}$ alkylated benzene sulfonic acid.

6. Claim 5 wherein said nonionic emulsifier is the condensation product of nonyl phenol and 100 ethyleneoxy units.

7. Claim 6 wherein said anionic emulsifier is present in an amount of about 0.5 part by weight and said nonionic emulsifier is present in an amount of about 0.2 part by weight.

References Cited

UNITED STATES PATENTS

| | | | |
|---|---|---|---|
| 2,503,264 | 3/1950 | Craig | 252—311.5 |
| 3,102,065 | 8/1963 | Thurlow | 252—311.5 |
| 3,345,193 | 10/1967 | Pitchford | 252—311.5 |
| 3,513,005 | 5/1970 | Bradshaw | 106—280 |

JOHN D. WELSH, Primary Examiner

U.S. Cl. X.R.

106—277